United States Patent
Herrero

(10) Patent No.: US 9,614,816 B2
(45) Date of Patent: *Apr. 4, 2017

(54) DYNAMIC ENCRYPTION FOR TUNNELED REAL-TIME COMMUNICATIONS

(71) Applicant: Oracle International Corporation, Redwood Shores, CA (US)

(72) Inventor: Rolando Herrero, Derry, NH (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/665,184

(22) Filed: Mar. 23, 2015

(65) Prior Publication Data

US 2016/0285823 A1 Sep. 29, 2016

(51) Int. Cl.
| | | |
|---|---|---|
| *H04L 29/06* | (2006.01) | |
| *H04W 12/02* | (2009.01) | |
| *H04W 40/00* | (2009.01) | |

(52) U.S. Cl.
CPC ...... *H04L 63/0428* (2013.01); *H04L 63/0272* (2013.01); *H04W 12/02* (2013.01); *H04W 40/00* (2013.01); *H04L 63/166* (2013.01)

(58) Field of Classification Search
CPC   G06F 15/16; G06F 17/30; G06F 7/04; H04N 7/16
USPC ........................................................ 713/153
See application file for complete search history.

(56) References Cited

U.S. PATENT DOCUMENTS

| | | | |
|---|---|---|---|
| 8,195,818 B2 | 6/2012 | Srinivasan et al. | |
| 2002/0099936 A1* | 7/2002 | Kou ..................... | H04L 63/0442 713/151 |
| 2002/0157019 A1* | 10/2002 | Kadyk ................ | H04L 63/0281 726/4 |
| 2003/0231629 A1* | 12/2003 | Banerjee ............. | H04L 12/1859 370/390 |
| 2010/0325294 A1* | 12/2010 | Srinivasan ........... | H04L 63/168 709/229 |
| 2011/0231652 A1* | 9/2011 | Bollay .................. | H04L 63/166 713/153 |
| 2013/0276073 A1* | 10/2013 | Sanda ..................... | G06F 21/33 726/5 |

(Continued)

OTHER PUBLICATIONS

Oracle Communications; Oracle Data Sheet; "Acme Packet 4500"; http://www.oracle.com/us/industries/communications/acme-packet-4500-ds-1990148.pdf; last downloaded Oct. 20, 2014.

(Continued)

*Primary Examiner* — Harunur Rashid
(74) *Attorney, Agent, or Firm* — Miles & Stockbridge P.C.

(57) ABSTRACT

A system performs tunneling for real-time communications ("RTC"). The system establishes an unencrypted tunnel between a tunneling server and a user equipment ("UE"). Upon establishing the unencrypted tunnel, the UE creates a socket on the unencrypted tunnel. The system determines that the socket requires encrypted RTC, and establishes an encrypted tunnel between the tunneling server and the UE. Upon establishing the encrypted tunnel, the UE moves the socket from the unencrypted tunnel to the encrypted tunnel, and the system performs the encrypted RTC via the socket over the encrypted tunnel.

20 Claims, 4 Drawing Sheets

(56) References Cited

U.S. PATENT DOCUMENTS

| | | | |
|---|---|---|---|
| 2013/0283037 A1* | 10/2013 | Katz ..................... | H04L 63/04 713/151 |
| 2013/0332724 A1* | 12/2013 | Walters ............... | H04L 63/0471 713/153 |
| 2015/0188889 A1* | 7/2015 | Lawson .............. | H04L 63/0281 726/15 |

OTHER PUBLICATIONS

3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

DYNAMIC ENCRYPTION FOR TUNNELED REAL-TIME COMMUNICATIONS

FIELD

One embodiment is directed generally to a communications network, and in particular, to delivering real-time traffic over a communications network.

BACKGROUND INFORMATION

Many enterprises have moved from telephony services using the Public Switched Telephone Network ("PSTN") (provided by a traditional telephone company) to telephony services using the Internet Protocol ("IP") (provided by an IP Telephony service provider). Such services are commonly known as Voice over IP ("VoIP") or IP Telephony. IP Telephony uses an IP network (e.g., the Internet) as a backbone and can thus provide advanced features such as video conferencing, call recording, and call forwarding.

Recently, driven by the growing base of mobile data subscribers, ubiquitous Internet access, and high bandwidth that is now available in both fixed and mobile networks, advanced services accessed via the Internet (known as Over-the-Top ("OTT") services) have become popular. However, while OTT services threaten traditional telephony offerings, innovative service providers are introducing their own OTT services, and must therefore overcome a number of unique challenges as they deploy and market these new services.

SUMMARY

One embodiment is a system that performs tunneling for real-time communications ("RTC"). The system establishes an unencrypted tunnel between a tunneling server and a user equipment ("UE"). Upon establishing the unencrypted tunnel, the UE creates a socket on the unencrypted tunnel. The system determines that the socket requires encrypted RTC, and establishes an encrypted tunnel between the tunneling server and the UE. Upon establishing the encrypted tunnel, the UE moves the socket from the unencrypted tunnel to the encrypted tunnel, and the system performs the encrypted RTC via the socket over the encrypted tunnel.

DETAILED DESCRIPTION

One embodiment provides dynamic tunnel traffic encryption services (herein referred to as "DTTE" services) for real-time communications ("RTC") in a network environment. In one embodiment, instead of establishing encrypted tunnels by default, an unencrypted tunnel is initially established, and then if there are individual sockets in the unencrypted tunnel that require encryption, an encrypted tunnel is established and the sockets are moved on-demand between the encrypted tunnel and the unencrypted tunnel based on socket-specific encryption requirements. Accordingly, embodiments make efficient use of encrypted and unencrypted tunnels while meeting encryption requirements of each socket individually and on-demand/dynamically, thereby providing DTTE services.

Figure 1:
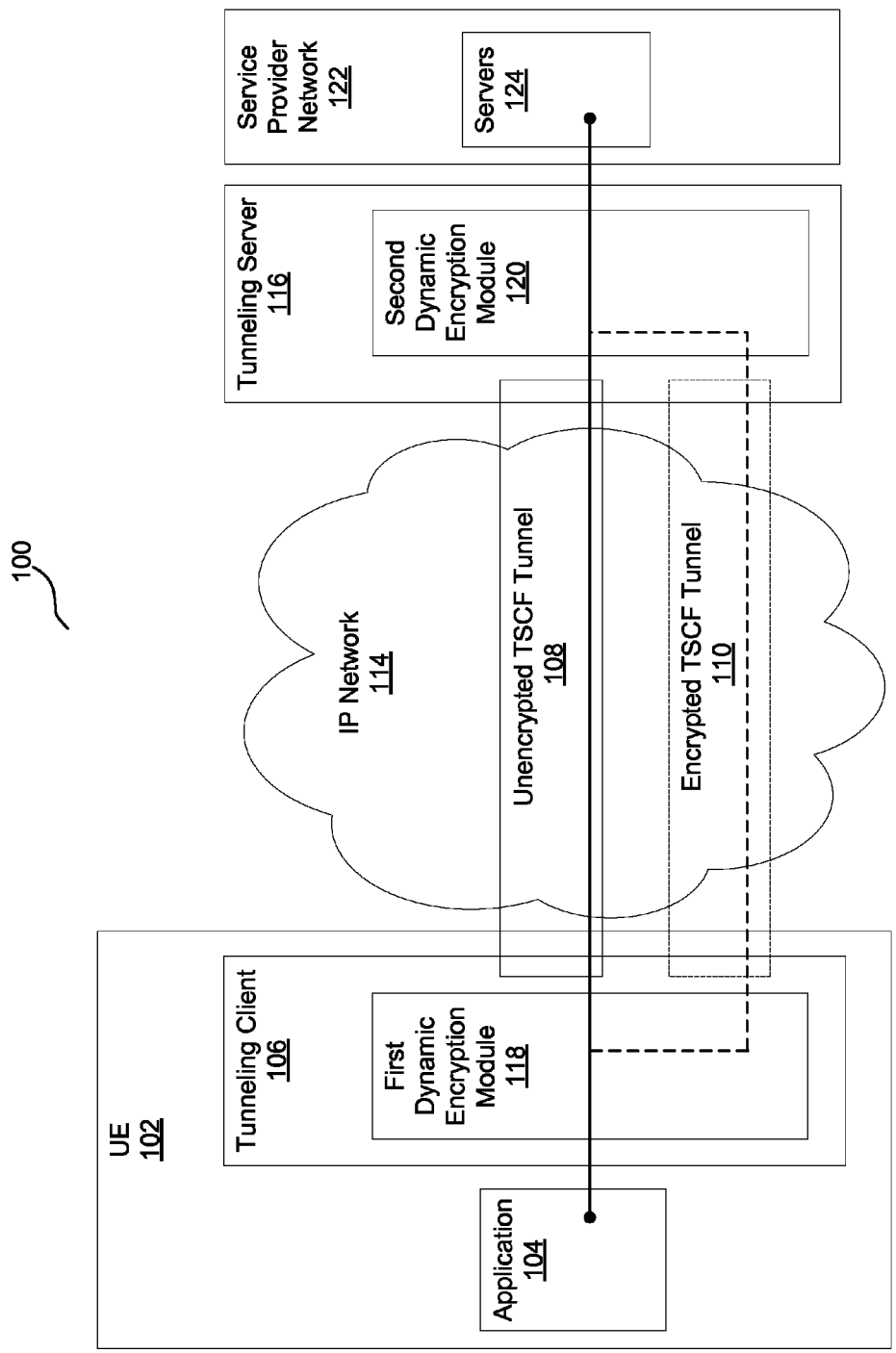
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs RTC over an Internet Protocol ("IP") network 114 with a service provider network 122. RTC refers to a mode of communication in which users exchange information instantly or with negligible latency. Example applications for RTC include voice and/or video calls, application streaming, softphones, and remote desktop applications. UE 102 may be any device used by an end-user for communication, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is a signaling communications protocol, conventionally used for controlling multimedia communication sessions such as voice and video calls over IP networks. SIP is configured to be independent of the underlying transport layer. Accordingly, SIP can run on different transport protocols, such as the Transmission Control Protocol ("TCP"), the User Datagram Protocol ("UDP"), etc.

TCP is one of the core protocols of the IP suite and provides reliable, ordered, and error-checked delivery of a stream of octets between programs running on computers connected to an IP network such as a local area network, an intranet, or the public Internet, as described in, for example, Internet Engineering Task Force ("IETF") request for comments ("RFC") 793 and RFC 675. A datagram is a basic transfer unit associated with a packet-switched network for which the delivery, arrival time, and order of arrival need not be guaranteed by the network. UDP is a protocol that uses a simple connectionless transmission model with a minimum of protocol mechanisms, as described in, for example, IETF RFC 768. Applications that do not require the reliability of a TCP connection may instead use UDP which emphasizes low-overhead operation and reduced latency rather than error checking and delivery validation.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which being incorporated herein by reference. In general, using a tunnel for communication refers to using a delivery protocol to encapsulate a different payload protocol.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol configured to provide communication security over the Internet. TLS is an IETF standards track protocol as provided in, for example, IETF RFC 2246, RFC 4346, RFC 5246, and/or RFC 6176. DTLS is a protocol that provides communications privacy for datagram protocols. DTLS allows datagram-based applications to communicate in a way that prevents eavesdropping, tampering, or message forgery. DTLS is based on the stream-oriented TLS protocol and provides similar security guarantees. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage a corresponding TSCF tunnel so that UE 102 may use the TSCF tunnel to traverse such security devices and connect to tunneling server 116 to reach service provider network 122.

The TSCF standard further provides control messages for exchanging configuration information between client side and server side network elements that establish and manage tunnels for performing RTC (e.g., tunneling client 106 and tunneling server 116 in FIG. 1). According to the TSCF standard, control messages between client side and server side network elements are of a "request/response" type, and a control message response for a request includes either a corresponding reply or an error code indicating why the request could not be honored. TSCF control messages utilize a Type Length Value ("TLV") encoding. TLV is defined as the variable length concatenation of a unique Type (represented by an integer) and a Value containing the actual value identified by the Type.

Each TSCF control message includes a control message header at the beginning. Table 1 below provides an example TSCF control message header configuration.

TABLE 1

| Field Name | Value Type | Length |
|---|---|---|
| CM_Version | Unsigned integer | 4 bits |
| CM_Indication | bits | 2 bits |
| Reserved | bits | 2 bits |
| CM_Type | Unsigned integer | 1 byte |
| TLV_Count | Unsigned integer | 2 bytes |
| Tunnel Session ID | Unsigned integer | 8 bytes |
| Sequence | Unsigned integer | 4 bytes |

An Example TSCF Control Message Header Configuration

In the header configuration of Table 1, the "CM_Version" field is the first nibble (i.e., 4 bits) of the first byte and identifies the version of the header. Currently version 1 is supported and versions 4 and 6 are reserved for IP payload differentiation (the first nibble of the first byte of IP header is the IP header version which is 4 for IPv4 and 6 for IPv6). The "CM_Version" field is required to indicate the outer transport protocol of a TSCF tunnel. The "CM_Indication" field identifies whether the message is a control message or not. This field must be set to 0 to indicate that a message is a control message. The "Reserved" field is reserved for future use and its bits are set to zero. The "CM_Type" field identifies the type of the control message, e.g., whether it is a request or a response, and the functionality it is used for. The "TLV Count" field indicates the number of TLVs that follow (or are appended to) the header in the current control message. The control message header itself is not a TLV and is not counted as one. The "Tunnel Session ID" ("TSID") field includes a TSID that is assigned by a server side network element to uniquely identify a TSCF tunnel. The "Sequence" field is an ever incrementing transaction counter so that each outstanding "request" message includes a unique value in this field.

In one embodiment, in order to establish a TSCF tunnel, tunnelling client 106 sends a "configuration request" message to tunnelling server 116 to obtain configuration information for a TSCF tunnel. Table 2 below provides an example "configuration request" message header.

TABLE 2

| Field Name | Value | Notes |
|---|---|---|
| CM_Version | 1 | Current = 1 |
| CM_Indication | 0 | Must be set as 0 to indicate this is a control message |
| Reserved | 0 | Must be set as 0 |
| CM_Type | 1 | Indicates a "Configuration_Request" |
| TLV_Count | Variable | |
| Tunnel Session ID | FFF . . . | |

An Example "Configuration Request" Message Header

As provided in Table 2, in the "configuration request" message, all TSID header field bits are set to 1 (i.e., FFFF . . . ). In response, tunnelling server 116 assigns a TSID to a TSCF tunnel and sends a "configuration response" message back to tunnelling client 106. Table 3 below provides an example "configuration response" message header.

TABLE 3

| Field Name | Value | Notes |
|---|---|---|
| CM_Version | 1 | Current = 1 |
| CM_Indication | 0 | Must be set as 0 to indicate this is a control message |
| Reserved | 0 | Must be set as 0 |
| CM_Type | 2 | Indicates a "Configuration_Response" |
| TLV_Count | Variable | |
| Tunnel Session ID | The TSID assigned by the tunnelling server | |

An Example "Configuration Response" Message Header

As provided in Table 3, the "configuration response" message includes the assigned TSID. All following messages between tunnelling client 106 and tunnelling server 116 include this assigned TSID in their headers.

In one embodiment, if a control message is communicated between tunnelling client 106 and tunnelling server 116 and does not include the expected TSID, the control message is dropped and the corresponding TSCF tunnel is terminated. Alternatively, in one embodiment, tunnelling client 106 may send a "configuration release request" message to tunnelling server 116 to terminate a TSCF tunnel. In response to such a "configuration release request" message, tunnelling server 116 sends a "configuration release response" message to tunnelling client 106. At this time, the TSCF tunnel is terminated.

In one embodiment, UE 102 may execute a SIP based RTC application (e.g., application 104) that relies on a library such as the software development kit ("SDK") provided by the tunneled session management solution from Oracle Corp.

Figure 2:
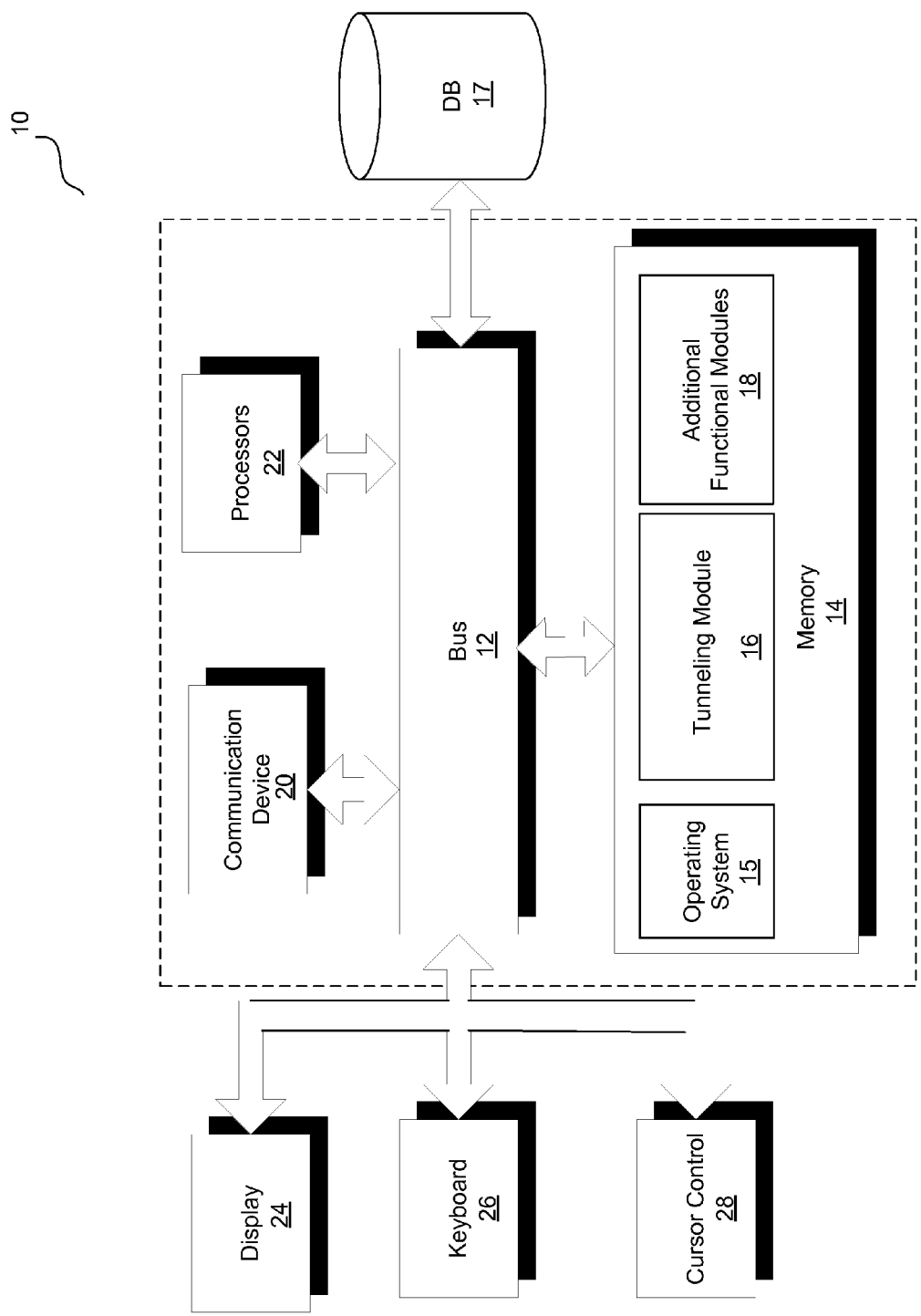
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a tunneling server, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a tunneling module 16 for providing tunneling, and all other functionality disclosed herein. In one example embodiment, tunneling module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for tunneling module 16 and additional functional modules 18.

Figure 4:
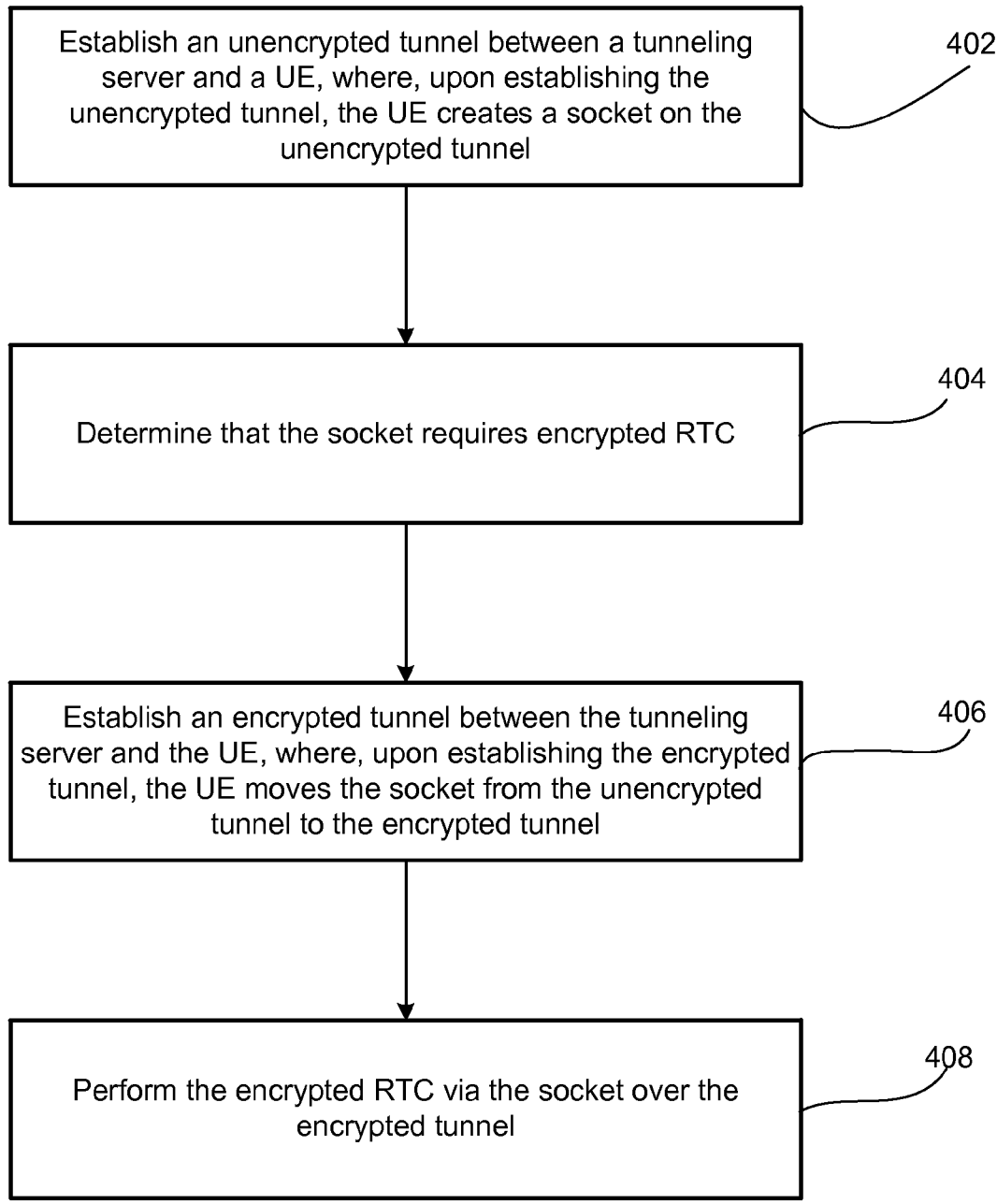
FIG. 4 is a flow diagram of the operation of the tunneling module of FIG. 2 when performing tunneling in accordance with embodiments of the present invention.

In one embodiment, tunneling module 16 and/or additional functional modules 18 may include an establishing module that establishes an unencrypted tunnel between a tunneling server and a UE, where, upon establishing the unencrypted tunnel, the UE creates a socket on the unencrypted tunnel; a determining module that determines that the socket requires encrypted RTC; the establishing module further establishing an encrypted tunnel between the tunneling server and the UE, where, upon establishing the encrypted tunnel, the UE moves the socket from the unencrypted tunnel to the encrypted tunnel; and a performing module that performs the encrypted RTC via the socket over the encrypted tunnel, as will be described herein with reference to FIG. 4.

Referring again to FIG. 1, with known systems, encryption of RTC traffic may be necessary in order to provide secure communications services at UE 102. However, due to limitations of tunneling server 116 and/or IP network 114, encryption of encapsulated RTC may not always be feasible or even needed. In one example, encryption is not feasible if tunneling server 116 does not have any encryption resources available or if the network firewalls filter encrypted traffic based on TLS port numbers. In another example, encryption is not needed if tunneled traffic runs purely in a controlled intranet environment or if media access protocols provide encryption (e.g., wireless fidelity ("WiFi") with encryption).

In some known systems, when executing real-time media applications with encapsulated traffic, UE 102 by default attempts to establish encrypted tunnels with tunneling server 116, and only switches to unencrypted tunnels if it is not possible to establish an encrypted tunnel. In these systems, it is generally up to application 104 to statically link inner sockets to tunnels and provide functionality for determining and tracking tunnel transports corresponding to the sockets.

A network socket is an endpoint of an inter-process communication flow across a computer network according to a communications protocol. A network socket may be a datagram socket or a stream socket. A datagram socket is a connectionless network socket. Each packet sent or received on a datagram socket is individually addressed and routed. A datagram is a basic transfer unit associated with a packet-switched network for which the delivery, arrival time, and order of arrival need not be guaranteed by the network. A stream socket provides a connection-oriented and sequenced with mechanisms for creating and destroying connections and for detecting errors. In general, for regular communications, a user can create a datagram or stream socket that uses the network interface of the system in which the application runs. In a TSCF environment, however, sockets use a tunnel for transport instead of a network interface. To differentiate these sockets from regular sockets, they are referred to as "inner sockets" since they only exist inside a tunnel.

One disadvantage with these known systems is that implementation of encrypted tunnels by default results in various performance issues, such as large overhead, latency, forced static dimensioning of encryption capabilities at tunneling server 116, etc. Forced static dimensioning of encryption capabilities refers to the assignment of several resources for encryption when they may not be really used. The more encryption resources that are pre-allocated, the more memory is used. This limits the number of available channels for non-TSCF services (e.g., Secure Real-time Transport Protocol ("SRTP"), Message Session Relay Protocol ("MSRP"), etc.) since memory is shared by all server applications.

In contrast to the known systems, embodiments of the present invention provide dynamic and efficient tunnel traffic encryption (herein referred to as DTTE services) by moving inner RTC sockets across encrypted and unencrypted tunnels. In one embodiment, UE 102 dynamically moves inner RTC sockets between an unencrypted TSCF tunnel 108 and an encrypted TSCF tunnel 110 on an on-demand basis and according to predefined levels of encryption requirements. Thus, embodiments allow inner media sockets to be individually secured based on respective security requirements.

In one embodiment, since an inner socket only exists in association with a tunnel and socket traffic gets transported by the tunnel, in order to change the transport (or tunnel type) of an inner socket, it is "moved," meaning that all references to the socket (e.g., references already created/configured by application 104) are removed from the source tunnel and added to the destination tunnel. The socket is neither destroyed nor reconfigured, but its reference (i.e., pointer) is moved from the source tunnel to the destination tunnel. This functionality is transparent to the end user that keeps using the socket without being aware of it being moved.

In one embodiment, dynamic tunnel traffic encryption functionality is implemented by a first dynamic encryption module 118 at tunneling client 106 and a second dynamic encryption module 120 at tunneling server 116. In this embodiment, first dynamic encryption module 118, in coordination with second dynamic encryption module 120, determines on-demand socket security requirements on a per socket basis, and moves sockets accordingly between unencrypted TSCF tunnel 108 and encrypted TSCF tunnel 110.

In one embodiment, first dynamic encryption module 118 tags inner sockets of application 104 with different security/encryption levels such that respective state machines at tunneling client 106 and tunneling server 116 may provide functionality to support efficient communication of encapsulated RTC traffic in a cost-effective and yet secure way for each socket. In one example, the socket may be configured with a tag that can have three possible values indicating, respectively, that no encryption is needed, encryption is optional/preferred, and encryption is mandatory. Depending on this value, the tunneling framework state machine moves sockets around from one tunnel (e.g., unencrypted) to another (e.g., encrypted).

One embodiment allows inner media sockets to be marked for encryption based on three levels of security: "unencrypted," "encrypted only," and "encrypted preferred." In this embodiment, first dynamic encryption module 118 moves inner sockets of application 104 from encrypted TSCF tunnel 110 to unencrypted TSCF tunnel 108 and vice versa, depending on network conditions. For example, if a socket is marked as "encrypted preferred" and resides in unencrypted TSCF tunnel 108, first dynamic encryption module 118 tries to move it to encrypted TSCF tunnel 110, and will create a new encrypted tunnel if none is available. If this is not possible, the socket stays in unencrypted TSCF tunnel 108. In another example, if a socket is marked as "encrypted only" and resides in unencrypted TSCF tunnel 108, first dynamic encryption module 118 tries to move it to encrypted TSCF tunnel 110, and will create a new encrypted tunnel if none is available. If this is not possible the socket indicates an error and fails to transmit traffic. In another example, if a socket is marked as "unencrypted" and resides in encrypted TSCF tunnel 110, first dynamic encryption module 118 will move the socket to unencrypted TSCF tunnel 108.

In one embodiment, when a socket is configured as "unencrypted," first dynamic encryption module 118 moves the corresponding traffic to (or keeps the corresponding traffic in) unencrypted TSCF tunnel 108. When a socket is configured as "encrypted only," first dynamic encryption module 118 moves the corresponding traffic to (or keeps the corresponding traffic in) encrypted TSCF tunnel 110. If a socket is configured as "encrypted only" and no encrypted tunnel is available (e.g., encrypted TSCF tunnel 110 is not established and/or cannot be established), then first dynamic encryption module 118 prohibits data transmission on that socket. When a socket is configured as "encrypted preferred," first dynamic encryption module 118 moves the corresponding traffic to (or keeps the corresponding traffic in) encrypted TSCF tunnel 110. If a socket is configured as "encrypted preferred" and no encrypted tunnel is available (e.g., encrypted TSCF tunnel 110 is not established and/or cannot be established), first dynamic encryption module 118 moves the corresponding traffic to (or keeps the corresponding traffic in) unencrypted TSCF tunnel 108.

In one embodiment, after a socket is moved to encrypted TSCF tunnel 110, first dynamic encryption module 118 may move the socket back to unencrypted TSCF tunnel 108 if network conditions and/or application requirements of application 104 are changed such that encryption requirements of the socket can still be met after moving the socket back to unencrypted TSCF tunnel 108. For example, after a socket is moved to encrypted TSCF tunnel 110, if application 104 indicates that encryption is no longer required for RTC communications via that socket (e.g., application 104 updates the socket and marks it as "unencrypted"), first dynamic encryption module 118 moves the socket back to unencrypted TSCF tunnel 108. Alternatively, after a socket is moved to encrypted TSCF tunnel 110, if network conditions improve such that unencrypted TSCF tunnel 108 can provide secure communications for the socket, first dynamic encryption module 118 moves the socket back to unencrypted TSCF tunnel 108.

In one embodiment, unencrypted TSCF tunnel 108 and encrypted TSCF tunnel 110 are compliant with TSCF tunnel management (e.g., tunnel initialization, maintenance, termination, etc., as defined by, e.g., 3GPP TR 33.830 V0.5.0), and TSCF tunnel transport protocols are supported for the negotiation of both unencrypted TSCF tunnel 108 and encrypted TSCF tunnel 110 between tunneling client 106 and tunneling server 116.

Figure 3:
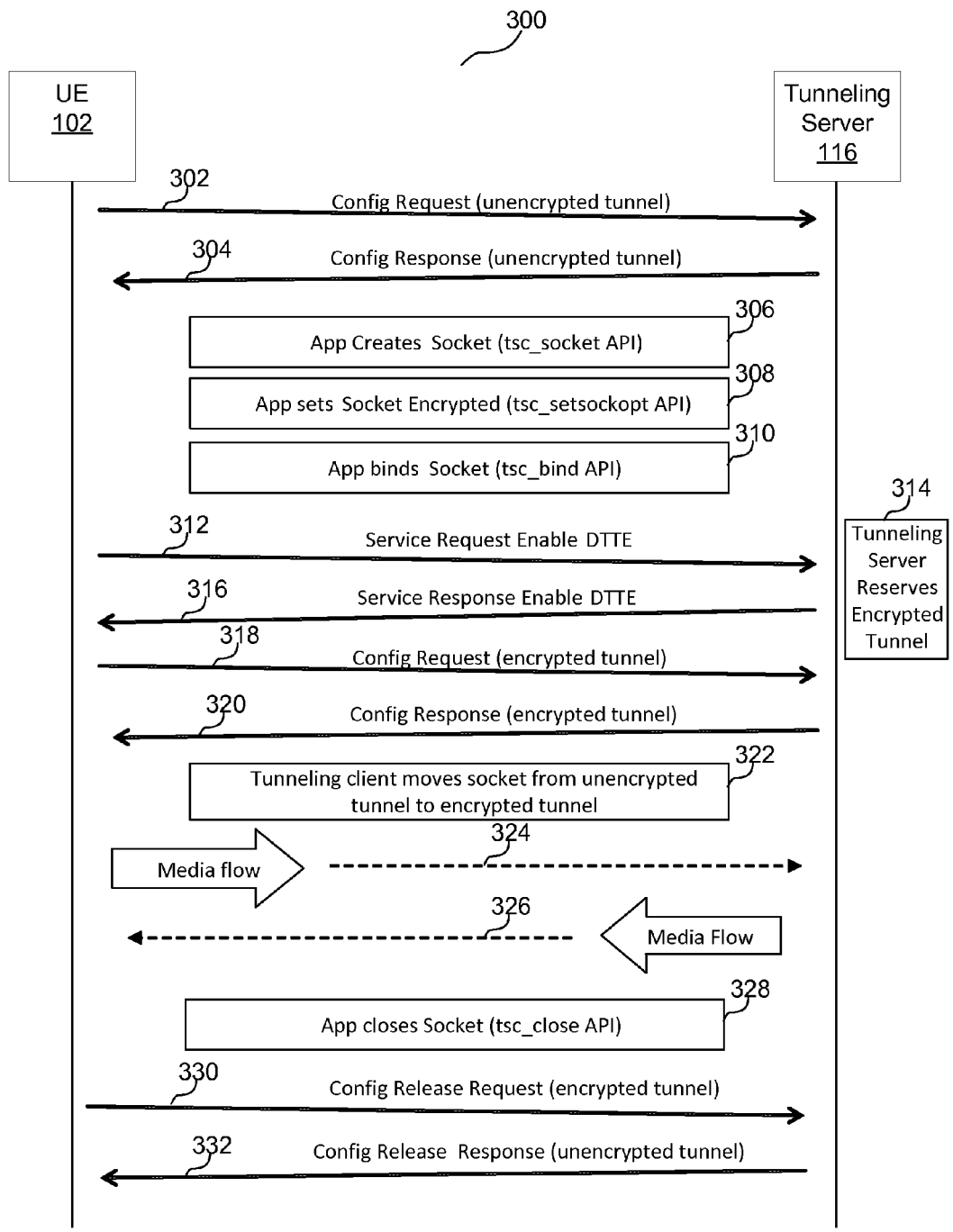
FIG. 3 is a message sequence diagram in accordance with embodiments of the present invention.

One embodiment provides TSCF service request functionality such that tunneling client 106 may request DTTE services from tunneling server 116. This embodiment provides TSCF control messages for exchanging configuration information between tunneling client 106 and tunneling server 116 for disabling and enabling DTTE services at tunneling server 116. FIG. 3 is an example message sequence diagram 300 including the sequence of messages exchanged for providing DTTE services, according to some present embodiments. FIG. 3 includes network elements such as UE 102 and tunneling server 116, as described herein with reference to FIG. 1.

At 302, tunneling client 106 at UE 102 sends a configuration request control message to tunneling server 116 to establish unencrypted TSCF tunnel 108, and at 304, tunneling server 116 responds to the configuration request control message of tunneling client 106 with a configuration response control message. Configuration request and response messages allow for tunneling client 106 to obtain configuration information for unencrypted TSCF tunnel 108 from tunneling server 116, as described in, for example, 3GPP TR 33.830 V0.5.0. Upon completing the exchange of configuration request/response messages, tunneling client 106 and tunneling server 116 may use unencrypted TSCF tunnel 108 for performing RTC. In one embodiment, from the RTC application perspective, application 104 at UE 102 creates only one TCP/UDP "always on" regular tunnel (i.e., unencrypted TSCF tunnel 108) by executing a "tsc_ctrl_new_tunnel" application programming interface ("API"), and the configuration request control message is sent in response to the execution of this API.

At 306, when an inner socket is needed (e.g., for communicating SIP call control traffic or RTP media traffic), application 104 creates this socket on unencrypted TSCF tunnel 108 by executing a "tsc_socket" API. A socket is created by determining a socket type (e.g., datagram vs stream) and a tunnel on which the socket should be created.

At 308, in order to implement DTTE services, application 104 marks the new inner socket according to its corresponding security requirements by executing the "tsc_setsockopt" API and using one of the following types:
  tsc_so_tunnel_transport_unencrypted;
  tsc_so_tunnel_transport_encrypted_only;
  tsc_so_tunnel_transport_encrypted_preferred.
For example, when maximum security is needed, the socket is marked using the "tsc_so_tunnel_transport_encrypted_only" type. This marking is stored together with all the additional socket information.

At 310, application 104 binds the socket by executing a "tsc_bind" API. The bind function assigns a specific transport port (e.g., TCP or UDP) to the socket. This port is later used as a source port of all traffic generated by the socket.

At 312, since the socket resides in a TCP/UDP tunnel (i.e., unencrypted tunnel 108) and is marked for DTTE services, first dynamic encryption module 118 at tunneling client 106 sends a TSCF service request control message to tunneling server 116 to initiate/enable DTTE services.

At 314, second dynamic encryption module 120 at tunneling server 116 receives this service request control message and reserves a new TLS/DTLS tunnel (i.e., encrypted TSCF tunnel 110).

At 316, tunneling server 116 sends a TSCF service response control message back to tunneling client 106 to indicate that DTTE services are enabled. This TSCF service response control message includes the TID of the newly reserved tunnel, encrypted TSCF tunnel 110.

At 318, upon receiving the TSCF service response control message, tunneling client 106 negotiates with tunneling server 116 for encrypted TSCF tunnel 110 by sending a TSCF configuration request control message.

At 320, tunneling server 116 responds to the TSCF configuration request control message by sending a TSCF configuration response control message back to tunneling client 106.

At 322, upon receiving the TSCF configuration response control message which indicates that encrypted TSCF tunnel 110 is established, tunneling client 106 moves the socket from unencrypted TSCF tunnel 108 to encrypted TSCF tunnel 110, and notifies application 104 that encryption has been enabled for that socket and therefore secure data can be transmitted. From this point on, all packets traversing that socket are communicated as encrypted traffic between tunneling client 106 and tunneling server 116 across encrypted TSCF tunnel 110.

For example, at 324, tunneling client sends encrypted media traffic over encrypted TSCF tunnel 110 to tunneling server 116, and at 326, tunneling server 116 sends encrypted media traffic over encrypted TSCF tunnel 110 to tunneling client 106.

At 328, application 104 terminates the socket by executing a "tsc_close" API. If no other encrypted sockets are present in encrypted TSCF tunnel 110, this tunnel is internally terminated by tunneling client 106 as follows.

At 330, tunneling client 106 sends a configuration release request control message to tunneling server 116 to terminate encrypted TSCF tunnel 110.

At 332, tunneling server 116 responds to the configuration release control message by sending a configuration release response control message back to tunneling client 106. At this time, encrypted TSCF tunnel 110 is terminated.

In one embodiment, if application 104 terminates unencrypted TSCF tunnel 108 by executing a "tsc_delete_tunnel" API, encrypted TSCF tunnel 110 is also terminated. If connectivity issues bring either one of encrypted TSCF tunnel 110 or unencrypted TSCF tunnel 108 down, tunneling client 106 attempts to re-establish connectivity and bring either tunnel back up according to the corresponding functionalities provided by the TSCF standard.

In one embodiment, in order to support DTTE services by reserving additional encrypted or unencrypted tunnels, tunneling server 116 is configured to provide two interfaces running on the same IP address: one unencrypted interface (e.g., TCP/UDP) and one encrypted interface (e.g., TLS/DTLS). In this embodiment, if the unencrypted interface is configured at tunneling server 116 on transport port number "port," then the encrypted interface is configured at tunneling server 116 on a transport port number "port+1." In this embodiment, second dynamic encryption module 120 at tunneling server 116 associates assigned tunnel IP addresses with specific tunnels and routes packets through the corresponding tunnels.

In one embodiment, each tunnel has an internal IP address associated with it. This IP address is typically the source address of all encapsulated traffic originated at tunneling client 106. If an inner socket is created in unencrypted TSCF tunnel 108, there is a binding at tunneling server 116 that links the internal IP address of unencrypted TSCF tunnel 108 to that socket. When the socket is moved to encrypted TSCF tunnel 110, that binding has to be removed and then recreated between the socket and the internal IP address of encrypted TSCF tunnel 110. This binding is needed to route traffic back from the untunneled side of an RTC (e.g., service provide network 122) to the tunneled side of an RTC (e.g., UE 102).

In one embodiment, first dynamic encryption module 118 at tunneling client 106 requests DTTE services by sending a TSCF client service request control message "TSC_TLV_SERVICE_TYPE_ENABLE_DTTE" to tunneling server 116. Upon receiving this client service request, second dynamic tunneling module 120 at tunneling server 116 determines if DTTE services are enabled for the interface in which the client service request is received. If DTTE services are enabled for that interface, tunneling server 116 responds to tunneling client 106 by sending a TSCF service response message "tsc_response_code_success." If DTTE services are disabled, tunneling server 116 sends a TSCF service response message "tsc_response_service_unavailable."

One embodiment provides TSCF software development kit ("SDK") APIs that allow sockets to be configured according to three encryption levels: "unencrypted," "encrypted only," and "encrypted preferred." In one embodiment, DTTE services are requested by application 104 by executing the "tsc_socket" API and setting the appropriate socket option as provided in the following functionality:

```
        tsc_so_tunnel_transport_encryption tunnel_transport =
tsc_so_tunnel_transport_encrypted_only;
        int result = tsc_setsockopt(rtp_socket, SOL_SOCKET,
SO_TSC_TUNNEL_TRANSPORT_ENCRYPTION,
                (char *)&tunnel_tranport,
                sizeof(tsc_so_tunnel_transport_encryption));
``` where:

```
        typedef enum
        {
            tsc_so_tunnel_transport_default = 0,
            tsc_so_tunnel_transport_unencrypted,
            tsc_so_tunnel_transport_encrypted_only,
            tsc_so_tunnel_transport_encrypted_preferred,
        } tsc_so_tunnel_transport_encryption;
```

Upon executing the above functionality, if "tsc_setsockopt" returns "−1," the option has not been set correctly. If it returns "0," the option has been set correctly but DTTE services are not enabled until encrypted TSCF tunnel 110 is created and negotiated. In one embodiment, a notification "tsc_notification_dtte" is used to indicate to application 104 that DTTE services are enabled. One embodiment enables this notification and provides a corresponding callback according to the following functionality:

```
        tsc_notification_enable(handle, tsc_notification_dtte,
            dtte_notification, NULL);
            void dtte_notification(tsc_notification_data *notification)
            {
                tsc_notification_dtte_info_data *dtte_data =
        (tsc_notification_dtte_info_data *)notification->data;
            if (dtte_data && dtte_data->available == tsc_bool_true) {
                if (dtte_data->enabled == tsc_bool_true) {
                    printf("dtte enabled on socket %d\n", dtte_data->socket);
                } else {
                    printf("dtte disabled on socket %d\n", dtte_data->socket);
                }
            } else {
                printf("dtte not allowed on socket %d\n", dtte_data->socket);
            }
        }
```

In the above functionality, the fourth "NULL" parameter in "tsc_notification_enable" is an opaque/private data pointer that can be recovered in the "tsc_notification_data" structure upon callback.

In one embodiment, in order to provide DTTE services, a keyword "DTTE" is included in the "assigned-services" parameter in the "tscf-interface" configuration object. When DTTE services are enabled, the configuration parameter "assigned-services" of the TSCF interface includes the "DTTE" keyword. When this keyword is not present in the configuration parameter "assigned-services" of the TSCF interface, DTTE services are disabled. In one embodiment, DTTE services are disabled by default. In one embodiment, the parameter "assigned-services" is real-time reconfigurable, and the new values are applied to newly established tunnels. Table 4 below provides an example TSCF parameter configuration for enabling DTTE services, according to some embodiments.

TABLE 4

| Parameter Name | XML tag | Data Type and Default | Value Ranges/ Possible Values | Required or Optional |
| --- | --- | --- | --- | --- |
| assigned-services | assigned-services | String: Blank | Combinations of: "SIP" "redundancy" "DDT" "DTTE" | Optional |

An Example TSCF Parameter Configuration for Enabling DTTE Services

FIG. 4 is a flow diagram of tunneling module 16 of FIG. 2 and/or tunneling server 116 of FIG. 1 when performing tunneling in accordance with embodiments of the present invention. In one embodiment, the functionality of the flow diagram of FIG. 4 is implemented by software stored in memory or other computer readable or non-transitory tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, tunneling client 106 and tunneling server 116 establish unencrypted TSCF tunnel 108. Upon establishing unencrypted TSCF tunnel 108, application 104 at UE 102 creates a socket on unencrypted TSCF tunnel 108. In some embodiment, application 104 marks the socket with a respective one of a plurality of encryption levels. In order to establish unencrypted TSCF tunnel 108, tunneling client 106 sends a configuration request message to tunneling server 116 to obtain configuration information for unencrypted TSCF tunnel 108, and tunneling server 116 responds to the configuration request message of tunneling client 106 by a corresponding configuration response message.

At 404, tunneling server 116 determines that the socket requires encrypted RTC upon receiving a service request message from tunneling client 106 indicating a request for enabling DTTE services. In some embodiments, the socket is determined to require encrypted RTC according to its corresponding encryption level within the plurality of encryption levels. Upon receiving the service request message, tunneling server 116 reserves encrypted TSCF tunnel 110 and responds to the service request message of tunneling client 106 by a corresponding service response message indicating that DTTE services are enabled. Tunneling server 116 provides an encrypted interface and an unencrypted interface corresponding to encrypted TSCF tunnel 110 and unencrypted TSCF tunnel 108, respectively. In one embodiment, the encrypted interface and the unencrypted interface run on the same IP address, the unencrypted interface being configured on a transport port number "N" and the encrypted interface being configured on a transport port number "N+1."

At 406, tunneling client 106 and tunneling server 116 establish encrypted TSCF tunnel 110. In order to establish encrypted TSCF tunnel 110, and upon receiving the service response message from tunneling server 116, tunneling client 106 sends a configuration request message to tunneling server 116 to obtain configuration information for encrypted TSCF tunnel 110. Tunneling server 116 responds to the configuration request message of tunneling client 106 by a corresponding configuration response message. Upon establishing encrypted TSCF tunnel 110, first dynamic encryption module 118 at tunneling client 106 moves the socket from unencrypted TSCF tunnel 108 to encrypted TSCF tunnel 110.

At 408, UE 102 and tunneling server 116 perform encrypted RTC via the socket over encrypted TSCF tunnel 110. In some embodiments, unencrypted TSCF tunnel 110 is terminated when application 104 closes the socket or when encrypted TSCF tunnel 108 is terminated.

As disclosed, embodiments allow for a TSCF tunneling configuration that provides DTTE services. Embodiments mark inner media sockets with different encryption levels, and based on those levels and network conditions, dynamically move sockets across encrypted and unencrypted TSCF tunnels. Accordingly, embodiments give the end user the possibility of utilizing encrypted and unencrypted tunnels in an efficient manner while also meeting encryption requirements of RTC on a per socket basis.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform tunneling for real-time communications (RTC), the tunneling comprising:
    establishing an unencrypted tunnel, exclusive of authentication and prior to an establishing of an encrypted tunnel, between a tunneling server and a user equipment (UE), wherein, upon establishing the unencrypted tunnel, the UE creates a socket that resides in the unencrypted tunnel;
    determining, by the UE, that the socket requires encrypted RTC, wherein the socket is determined to require encrypted RTC according to a corresponding encryption level;
    establishing an encrypted tunnel between the tunneling server and the UE, wherein, upon establishing the encrypted tunnel, the UE moves the socket from the unencrypted tunnel to the encrypted tunnel; and
    performing the encrypted RTC via the socket over the encrypted tunnel,
    wherein the tunneling server provides an encrypted interface and an unencrypted interface corresponding to the encrypted tunnel and the unencrypted tunnel, respectively; and
    wherein the encrypted interface and the unencrypted interface run on the same internet protocol (IP) address, the unencrypted interface being configured on a first transport port number and the encrypted interface being configured on a second transport port number.

2. The non-transitory computer readable medium of claim 1,
    wherein the tunneling server determines that the socket requires encrypted RTC upon receiving a service request message from the UE indicating a request for enabling dynamic tunnel traffic encryption services; and
    wherein, upon receiving the service request message, the tunneling server reserves the encrypted tunnel and responds to the service request message of the UE by a corresponding service response message indicating that dynamic tunnel traffic encryption services are enabled.

3. The non-transitory computer readable medium of claim 2,
    wherein the tunneling server provides an encrypted interface and an unencrypted interface corresponding to the encrypted tunnel and the unencrypted tunnel, respectively; and
    wherein the encrypted interface and the unencrypted interface run on the same internet protocol (IP) address, the unencrypted interface being configured on a transport port number N and the encrypted interface being configured on a transport port number N+1.

4. The non-transitory computer readable medium of claim 3,
    wherein, in order to establish the unencrypted tunnel and upon receiving the service response message from the tunneling server, the UE sends a configuration request message to the tunneling server to obtain configuration information for the encrypted tunnel; and
    wherein the tunneling server responds to the configuration request message of the UE by a corresponding configuration response message.

5. The non-transitory computer readable medium of claim 1,
    wherein the encrypted tunnel and the unencrypted tunnel are configured according to a tunneled services control function (TSCF) standard.

6. The non-transitory computer readable medium of claim 1,
    wherein the UE marks the socket with a respective one of a plurality of encryption levels.

7. The non-transitory computer readable medium of claim 1,
    wherein the unencrypted tunnel is terminated when the UE closes the socket or when the encrypted tunnel is terminated.

8. A method of tunneling for real-time communications (RTC), comprising:
    establishing an unencrypted tunnel, exclusive of authentication and prior to an establishing of an encrypted tunnel, between a tunneling server and a user equipment (UE), wherein, upon establishing the unencrypted tunnel, the UE creates a socket that resides in the unencrypted tunnel;
    determining, by the UE, that the socket requires encrypted RTC, wherein the socket is determined to require encrypted RTC according to a corresponding encryption level;
    establishing an encrypted tunnel between the tunneling server and the UE, wherein, upon establishing the encrypted tunnel, the UE moves the socket from the unencrypted tunnel to the encrypted tunnel; and
    performing the encrypted RTC via the socket over the encrypted tunnel,
    wherein the tunneling server provides an encrypted interface and an unencrypted interface corresponding to the encrypted tunnel and the unencrypted tunnel, respectively; and
    wherein the encrypted interface and the unencrypted interface run on the same internet protocol (IP) address, the unencrypted interface being configured on a first transport port number and the encrypted interface being configured on a second transport port number.

9. The method of claim 8,
wherein the tunneling server determines that the socket requires encrypted RTC upon receiving a service request message from the UE indicating a request for enabling dynamic tunnel traffic encryption services; and
wherein, upon receiving the service request message, the tunneling server reserves the encrypted tunnel and responds to the service request message of the UE by a corresponding service response message indicating that dynamic tunnel traffic encryption services are enabled.

10. The method of claim 9,
wherein the tunneling server provides an encrypted interface and an unencrypted interface corresponding to the encrypted tunnel and the unencrypted tunnel, respectively; and
wherein the encrypted interface and the unencrypted interface run on the same internet protocol (IP) address, the unencrypted interface being configured on a transport port number N and the encrypted interface being configured on a transport port number N+1.

11. The method of claim 10,
wherein, in order to establish the unencrypted tunnel and upon receiving the service response message from the tunneling server, the UE sends a configuration request message to the tunneling server to obtain configuration information for the encrypted tunnel; and
wherein the tunneling server responds to the configuration request message of the UE by a corresponding configuration response message.

12. The method of claim 8,
wherein the encrypted tunnel and the unencrypted tunnel are configured according to a tunneled services control function (TSCF) standard.

13. The method of claim 8,
wherein the UE marks the socket with a respective one of a plurality of encryption levels.

14. The method of claim 8,
wherein the unencrypted tunnel is terminated when the UE closes the socket or when the encrypted tunnel is terminated.

15. A system for tunneling of real-time communications (RTC), comprising:
a hardware processor configured to:
    establish an unencrypted tunnel, exclusive of authentication and prior to an establishing of an encrypted tunnel, between a tunneling server and a user equipment (UE), wherein, upon establishing the unencrypted tunnel, the UE creates a socket that resides in the unencrypted tunnel;
    determine, by the UE, that the socket requires encrypted RTC, wherein the socket is determined to require encrypted RTC according to a corresponding encryption level;
    establish an encrypted tunnel between the tunneling server and the UE, wherein, upon establishing the encrypted tunnel, the UE moves the socket from the unencrypted tunnel to the encrypted tunnel; and
    perform the encrypted RTC via the socket over the encrypted tunnel,
wherein the tunneling server provides an encrypted interface and an unencrypted interface corresponding to the encrypted tunnel and the unencrypted tunnel, respectively; and
wherein the encrypted interface and the unencrypted interface run on the same internet protocol (IP) address, the unencrypted interface being configured on a first transport port number and the encrypted interface being configured on a second transport port number.

16. The system of claim 15,
wherein the tunneling server determines that the socket requires encrypted RTC upon receiving a service request message from the UE indicating a request for enabling dynamic tunnel traffic encryption services; and
wherein, upon receiving the service request message, the tunneling server reserves the encrypted tunnel and responds to the service request message of the UE by a corresponding service response message indicating that dynamic tunnel traffic encryption services are enabled.

17. The system of claim 16,
wherein the tunneling server provides an encrypted interface and an unencrypted interface corresponding to the encrypted tunnel and the unencrypted tunnel, respectively; and
wherein the encrypted interface and the unencrypted interface run on the same internet protocol (IP) address, the unencrypted interface being configured on a transport port number N and the encrypted interface being configured on a transport port number N+1.

18. The system of claim 17,
wherein, in order to establish the unencrypted tunnel and upon receiving the service response message from the tunneling server, the UE sends a configuration request message to the tunneling server to obtain configuration information for the encrypted tunnel; and
wherein the tunneling server responds to the configuration request message of the UE by a corresponding configuration response message.

19. The system of claim 15,
wherein the encrypted tunnel and the unencrypted tunnel are configured according to a tunneled services control function (TSCF) standard.

20. The system of claim 15,
wherein the UE marks the socket with a respective one of a plurality of encryption levels.

* * * * *